United States Patent
Shmunk

(10) Patent No.: US 11,016,268 B2
(45) Date of Patent: May 25, 2021

(54) COLLAPSIBLE IMAGING SYSTEMS HAVING LENS ARRAYS

(71) Applicant: Almalence Inc., Austin, TX (US)

(72) Inventor: Dmitry Valerievich Shmunk, Novosibirsk (RU)

(73) Assignee: ALMALENCE INC., Austin, TX (US)

( * ) Notice: Subject to any disclaimer, the term of this patent is extended or adjusted under 35 U.S.C. 154(b) by 351 days.

(21) Appl. No.: 15/048,008

(22) Filed: Feb. 19, 2016

(65) Prior Publication Data

US 2018/0003925 A1 Jan. 4, 2018

(51) Int. Cl.
*G02B 13/00* (2006.01)
*G03B 17/04* (2021.01)
(Continued)

(52) U.S. Cl.
CPC ....... *G02B 13/0015* (2013.01); *G02B 3/0006* (2013.01); *G02B 23/20* (2013.01);
(Continued)

(58) Field of Classification Search
CPC G02B 13/0015; G02B 13/0055; G02B 23/20; G02B 27/0025; G02B 3/0006;
(Continued)

(56) References Cited

U.S. PATENT DOCUMENTS 5,353,165 A  10/1994  VanDeMoere et al.
5,519,539 A  5/1996   Hoopman et al.
(Continued)

FOREIGN PATENT DOCUMENTS

WO  2016053140  4/2016

OTHER PUBLICATIONS

International Search Report for International Application No. PCT/US2017/014299, International Filing Date Jan. 20, 2017; dated Apr. 17, 2017; 2 pages.
(Continued)

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

Optics systems presented are arranged as high-performance imagers particularly characterized by their exceptional compactness in view of image quality. A plurality of lens and let's and or doublets are configured to cooperate with related mount systems optimized for compactness. To achieve very high resolution imaging despite somewhat abbreviated compound lens design, these systems include use of lens array elements proximate to an imaging plane. So placed lens array devices may be designed with lens elements which invariably operate on incident wave planes with radial dependence. That is, the focusing strength of lenses from which these lens arrays are comprised may depend upon its distance from system optic axis. This enables an imaging correction function that counters distortion and other undesirable imaging errors typically present in a simplified compound lens systems. When used together and in conjunction with special-purpose collapsing lens mounting systems, an imaging system of very high fidelity and very compact weight size is achieved to great advantage in system when a premium on lens size is necessitated.

6 Claims, 8 Drawing Sheets

(51) Int. Cl.
  *G03B 17/12* (2021.01)
  *G02B 3/00* (2006.01)
  *H04N 5/225* (2006.01)
  *G02B 23/20* (2006.01)

(52) U.S. Cl.
  CPC ............ *G03B 17/04* (2013.01); *G03B 17/12* (2013.01); *H04N 5/2254* (2013.01); *G03B 2205/00* (2013.01)

(58) Field of Classification Search
  CPC ........ G02B 3/0056; G02B 7/023; G02B 9/12; G03B 17/04; G03B 17/12; G03B 2205/0092; H04N 5/2254
  See application file for complete search history.

(56) References Cited

U.S. PATENT DOCUMENTS

| | | | | |
|---|---|---|---|---|
| 5,633,762 | A * | 5/1997 | Richard | G02B 27/025 257/81 |
| 7,785,021 | B2 * | 8/2010 | Kato | G03B 17/04 359/817 |
| 7,880,794 | B2 * | 2/2011 | Yamagata | G02B 3/0043 348/335 |
| 8,259,212 | B2 * | 9/2012 | Brady | G02B 3/0056 348/340 |
| 8,615,143 | B2 * | 12/2013 | Maiorova | G02B 15/04 382/298 |
| 2005/0157299 | A1 | 7/2005 | Heffelfinger | |
| 2005/0207748 | A1 | 9/2005 | Ishizuka et al. | |
| 2007/0121212 | A1 | 5/2007 | Boettiger et al. | |
| 2008/0106811 | A1 * | 5/2008 | Eromaki | G02B 7/102 359/817 |
| 2010/0123819 | A1 * | 5/2010 | Yu | H04N 5/2254 348/360 |
| 2011/0058264 | A1 | 3/2011 | Zhan et al. | |
| 2012/0320257 | A1 | 12/2012 | Shabtay et al. | |
| 2014/0016016 | A1 * | 1/2014 | Berestov | H04N 5/23212 348/345 |
| 2014/0184809 | A1 | 7/2014 | Luan | |
| 2014/0192166 | A1 | 7/2014 | Cogswell et al. | |
| 2015/0077618 | A1 * | 3/2015 | Ueno | G02B 13/0035 348/340 |
| 2016/0295097 | A1 | 10/2016 | Shanmugavadivelu et al. | |
| 2016/0337632 | A1 | 11/2016 | Vandame et al. | |
| 2017/0269340 | A1 | 9/2017 | Shmunk | |
| 2018/0158175 | A1 | 6/2018 | Shmunk et al. | |
| 2018/0267298 | A1 | 9/2018 | Shmunk | |

OTHER PUBLICATIONS

Written Opinion for International Application No. PCT/US2017/014299, International Filing Date Jan. 20, 2017; dated Apr. 17, 2017; 6 pages.

Brady et al., "Multiscale Lens Design", Optical Society of America, vol. 17, Issue 13, pp. 10659-10674, Jun. 10, 2009.

International Search Report for corresponding PCT/US2018/035162; International Filing Date: May 30, 2018; dated Aug. 24, 2018; 2 pages.

Written Opinion of the International Searching Authority for International Application No. PCT/US2018/035162 filed on May 30, 2018; dated Aug. 24, 2018; 6 pages.

\* cited by examiner

COLLAPSIBLE IMAGING SYSTEMS HAVING LENS ARRAYS

BACKGROUND OF THE INVENTION

Field

The following invention disclosure is generally concerned with high performance optical systems for space constrained applications and specifically concerned with use of lens arrays in optical trains near image sensors to improve image resolution.

Optical lenses designed for imaging are generally formed of a plurality of cooperating elements in a system known as a 'compound lens'. To achieve high image fidelity or resolution, multiple elements systems are needed to remove imaging error and distortion. For example, the high quality lens systems reduced by leading the SLR camera manufacturers can in an Nikon are often comprised of seven or more discrete lens elements to form a very high performance compound lens. While achieving exceptionally high image quality, these configurations tend to be very bulky including both considerable weight and space demands. A typical DSL are lens used for professional still photography may way more than several towns and occupy hundreds and sometimes even thousands of cubic centimeters. While the burden of such hefty lenses is easily borne by dedicated professional photographers, others find such lenses to cumbersome for convenient use. For example, tourist and hobby photographers prefer to leave heavy professional equipment behind and tends to replace same by much lighter and smaller systems. However, like professional photographers even tourists an obvious still demand a high quality image. Therefore, great effort has been made to achieve lightweight compound lens systems that still have good imaging performance.

Indeed a most preferred approach adopted by camera manufacturers and others includes a collapsible compound lens that has to operational modes including a storage mode and an imaging mode. A collapsible lens system which compresses along a system imaging axes to remove or reduce space-between lens elements in a telescopic action, translates from an imaging mode to a storage mode. In reverse, an extension from a collapsed state returns lens elements to their working positions whereby sufficient prescribed states there between each are established by a precise mechanical system. The compound lens may be expanded for use in making images or videos, and returned to its storage position when not being used to form images. These telescopic lens systems are very popular and widely found on many types of cameras and video devices.

While telescopic collapsing compound lens systems offer a very significant weight and size savings simultaneously providing excellent image quality they do nevertheless remain somewhat problematic in several ways. As such those systems are not commonly found on many of the most modern camera devices being used today. For example, mobile telephone systems use a fixed lens rather than a collapsible system. Similarly, sports video devices such as go pro cameras also are configured with a fixed lens having a single operational mode which doesn't collapse into a storage configuration. In the case of mobile smartphones space and particularly thickness is a highly restricted commodity. Lens systems used in smartphone cameras must be very thin for suitable integration with common system packages. As such, smart phones are most generally designed with a thin fixed lens having a wide field of view.

The imaging limitations necessitated by such configurations are not trivial. Indeed, because so many people enjoy using their smart phone for photography an entire industry has developed around lens extension devices suitable for use in conjunction with a common smartphone camera. In particular, telephoto extenders, macro lens systems and others have been offered as 'clip on" type packages. These effectively make a smart phone operate in two modes where a storage mode includes removal of the lens extension device and replacement thereon permits and advanced imaging function with preferred lens characteristics. However such removable lens systems are also accompanied by inconveniences and shortcomings which tend to render their use less than ideal.

Excellent related uses of lens arrays in conjunction with pixelated image detectors are set forth in detail in a study done by Brady et al in a paper titled: "Multiscale Lens Design", Optical Society of America, 10 Jun. 2009. In this paper, a general multiscale optics concept is outlined and benefits are described. In particular, an optical imaging system is formed of two portions including a compound lens first stage portion arranged as a 'collector' and a second stage 'processor' that is comprised of a lens array and an image detector in close proximity thereto. The lenslets from which the array is comprised are particularly tuned and fashioned in view of modifications to ray bundles that are desirable for improved imaging results. The author instruct that is may be possible in some cases to correct lens aberrations of the collector stage with the processor.

While the presentation made in this research guides experts in the art to remarkable new potential solutions, it has not previously been discovered that such use of lens arrays might be designed with particular nature and structure that relaxes the positional tolerance on elements of the collector system. Rather, the entire effort of that study assumes that lens positions of the compound lens singlets are very well regulated and controlled. This is quite true in nearly every type of optical system such as microscopes, telescopes, cameras, video imagers, et cetera—because each of those systems includes a primary compound lens which is fixed and not part of a collapsing mechanical system.

However in the special case where a compound lens is formed in connection with a collapsible system such as a telescopic barrel lens, there is an accompanied imperfections with regard to lens placement and these imperfections introduce aberrations specific to lens element decentering and/or tilt, such as severe astigmatism, which are distinct from those commonly introduced as geometric lens errors. While no members of the very appreciably sized community of collapsible lens designers have yet considered using lens arrays to correct for poor lens placement aberrations, it is further the case that a special class of aberrations, distinct from those found in telescopic systems, are observed in collapsible systems which may be characterized as off-axis collapsible systems—e.g. those non telescopic systems which collapse on paths different than the system imaging axis.

It will be shown hereinfollowing that these highly unique collapsible systems do indeed generate certain types of imaging error and aberration particular to lens placement variance, and those errors and aberrations may be corrected when the lenslet design takes into account known, predictable and expected effects in the ray bundles near the image detector.

In a previous patent application by the current inventor, systems for collapsing a compound lens into a storage mode have been thoroughly taught and presented in U.S. Pat No. 10,334,192 B2 filed on Sep. 22, 2015. In that teaching, advanced mechanical systems are arranged to switch imaging systems between two operational modes including an imaging mode and a storage mode. In the storage mode, lens elements are held in a very thin planar volume which facilitate integration with devices having very strict space limitations. However, these special purpose mechanical devices tend to bring with them special imaging aberrations which require unique solutions not typically used in more common aberration correction schemes.

In another prior application filed by the inventor of these instant inventions herewith, very high performance mechanical systems are fully described and set forth to enable excellent spatial conservation in a collapsible lens system having storage and imaging modes. Translation between these modes assures an excellent imaging lens is available for making still and video images while at the same time providing for a very compact storage mode. This is particularly advantageous when these systems are deployed in conjunction with cameras having severe space and sometime weight constraints. Details of a helically collapsible system are described in full detail in U.S. patent application, Publication No. US20180011302A1 filed on Feb. 19, 2016.

Lens Arrays

Lens array systems have lately been given much greater attention with regard to their use in complex and compound optical devices due in part to the fact that new manufacturing processes including at least microlithography formation permit optical lenslet formation on a very small and precise scale. Further, lenslet arrays may be formed with programmed spatial variance whereby the lenses in one region of a lens array device may have performance characteristics different than a neighbor region of lenslets. There is considerable latitude for control of lens design.

Microlens arrays have been used in very special applications by Suss MicroOptics among others for more than 25 years. Today, lens arrays may be formed with manufacturing processes that permit great control over the nature of the lenslet elements. Both refractive and diffractive lens types are readily formed in.

While systems and inventions of the art are designed to achieve particular goals and objectives, some of those being no less than remarkable, these inventions of the art have nevertheless include limitations which prevent uses in new ways now possible. Inventions of the art are not used and cannot be used to realize advantages and objectives of the teachings presented herefollowing.

It should be understood that all of herein referenced materials and patent applications identified here provide considerable definition with regard to elements of these inventions. Therefore, those materials are incorporated herein by reference whereby this specification can rely upon them for enablement of the particular teachings of each.

SUMMARY OF THE INVENTION

Comes now, Dmitry Valerievich Shmunk with inventions of collapsible lens systems having lens array elements deployed as aberration correction. It is a primary function of these optical imaging systems to provide very high image quality despite mechanical imperfections necessarily present in collapsing arrangements. It is a contrast to prior art methods and devices that systems first presented here do not collapse on an axial or telescopic mode but rather collapse along off-axis paths. More particularly, these systems collapse from an imaging mode into a storage mode characterized as a thin planar volume. A fundamental difference between collapsible lens systems of the instant invention and those of the art can be found when considering these off-axis collapsing schemes. Further fundamental differences and distinguishing factors are readily discerned when considering special means and strategy for mitigation of particular aberrations due to imperfect lens placement. Specifically, lens array processor elements are specifically designed to operate on incident wavefronts to the reduce image errors that result from known mechanical variance associated with a collector design.

Systems first presented and described herein relate to high performance imaging systems having exceptional portability and mobility. Due to a novel collapsing system which is allowed in further view of new error correction arrangements, these imager operate in two functional modes including an imaging mode and a storage or collapsed mode. Translation between these two modes tends to result in imperfect lens placement with respect to the elements of a compound lens. Special provision for correction of image errors is included to achieve very high resolution despite the abbreviated optics and imperfect mechanical translation.

Generally, collapsible lenses are not possible with mechanical systems which have imperfect lens placement due to degradation of imaging performance. However, because a special function lens array is used for error correction in combination with these mechanical collapsible compound lens arrangement, we are able to assure high performance imaging despite the otherwise unfavorable result. Thus, it is first suggested here that an off-axis collapsible lens system be combined with aberration correction in the form of a lens array disposed near the image field of a compound lens.

Objectives of the Invention

It is a primary object of these inventions to provide novel lightweight optical imaging systems.

It is an object of the invention to provide collapsible optical systems having very high performance imaging function.

It is a further object to provide means for imaging, said means being collapsible into a very thin storage volume.

It is an object of the invention to enable high performance imaging in lightweight and highly mobile packages.

A better understanding can be had with reference to detailed description of preferred embodiments and with reference to appended drawings. Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present inventions will become better understood with regard to the following description, appended claims and drawings where:

Figure 5:
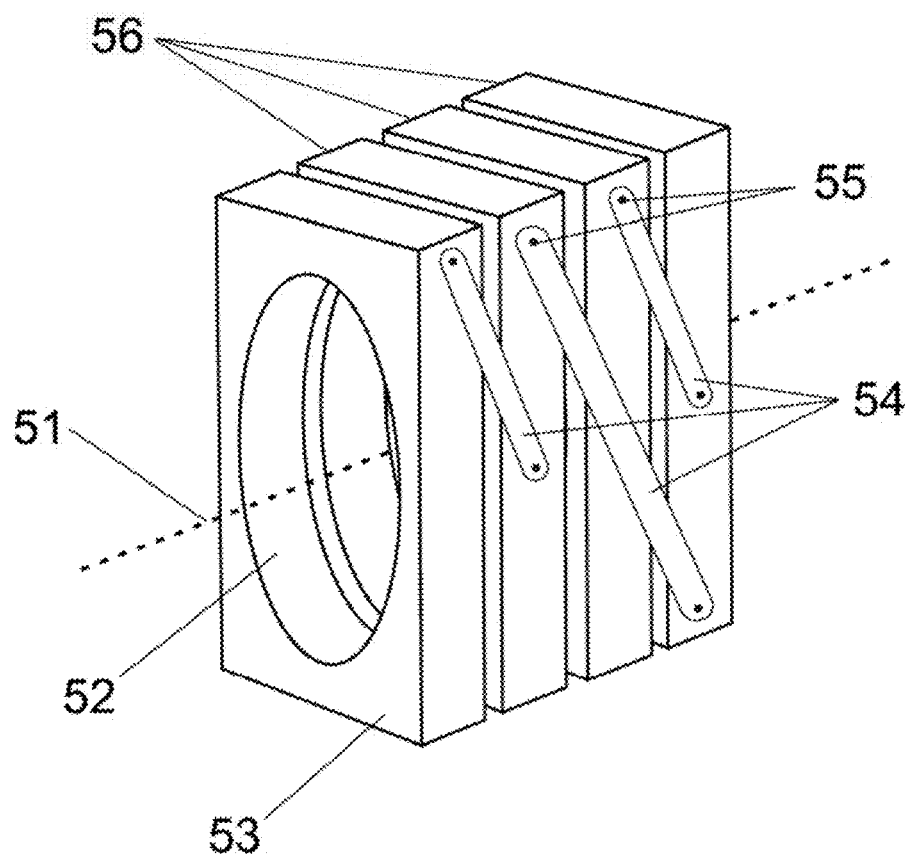
Figure 6:
Figure 7:
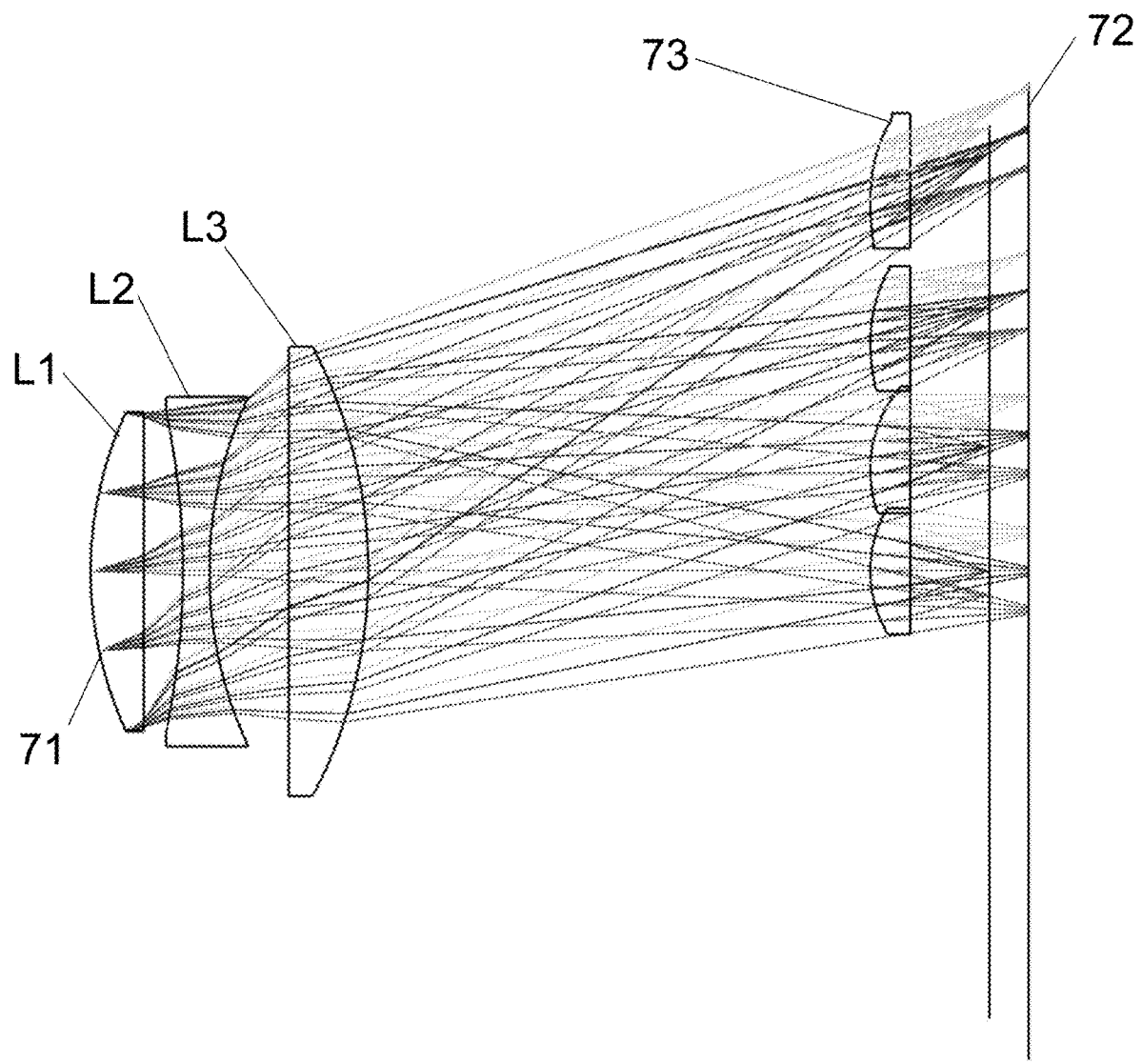
Figure 8:
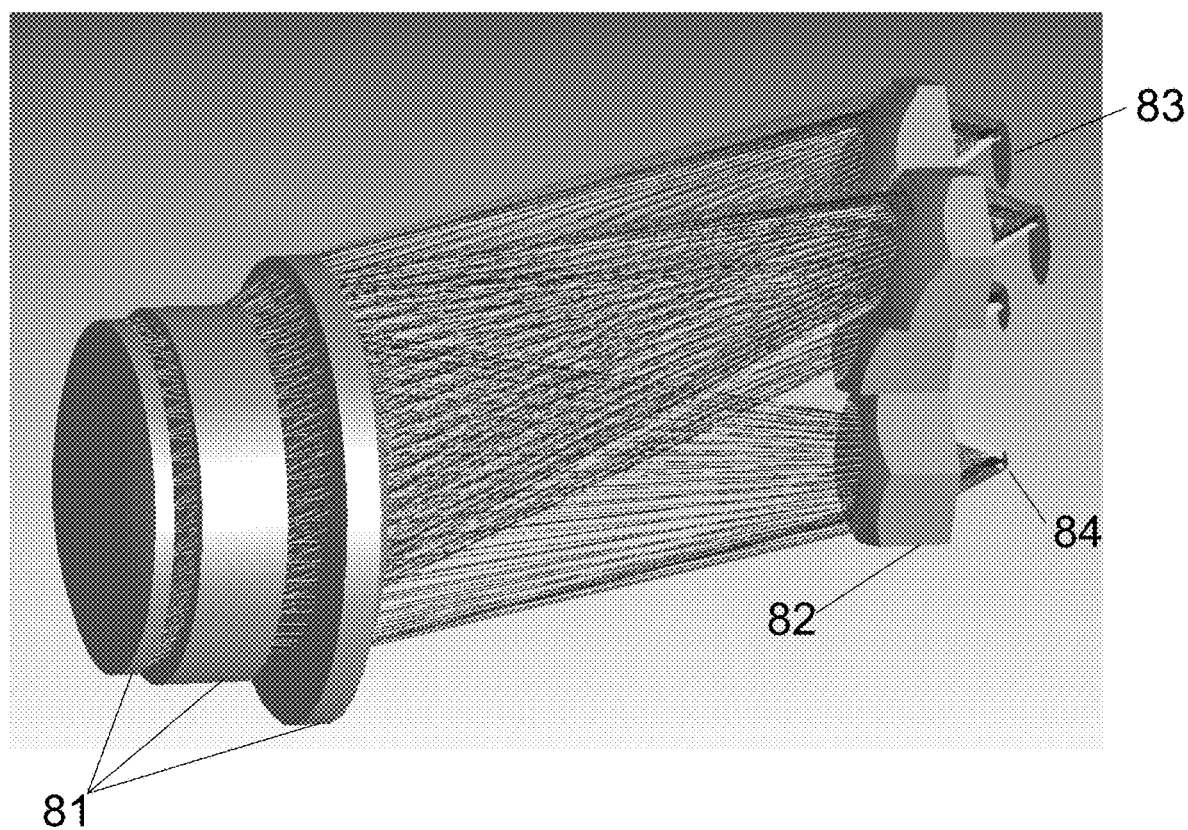

FIG. 5 presents an alternative version where frame elements fashioned to hold lenses flip via pivots and linking arms between storage to imaging modes;

FIG. 6 illustrates the very thin package of a mobile smartphone having integrated therein one version of these collapsible lens systems;

FIG. 7 is one ray trace diagram that illustrates focusing on ray bundles in cellular regions via a lens array device; and FIG. 8 is another ray trace diagram with shading in an alternative perspective to more clearly show an arrangement suitable for these designs.

GLOSSARY OF SPECIAL TERMS

Throughout this disclosure, reference is made to some terms which may or may not be exactly defined in popular dictionaries as they are defined here. To provide a more precise disclosure, the following term definitions are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Substrate or Frame

For purposes of this disclosure, a 'substrate' or 'frame element' is a mechanical structure provided to receive and hold therein an optical lens. The substrate or frame having a mechanical relationship with cooperating coupled frames whereby they operate together to switch between an imaging mode and a storage mode.

Lens Array

Lens array and microlens arrays are optical systems having a two dimensional distribution of discrete lens elements over a substrate. Both refractive and diffractive lens arrays are realized when the surface of a substrate of optical material is fashioned into cellular units having optical power with regard to incident wavefronts.

DETAILED DESCRIPTION AND PREFERRED EMBODIMENTS

Lens systems having particular important advantage are taught hereinfollowing. Specifically, lens systems described in this text may be characterized as those which support use in imagers such as video and still cameras having size limits. For example, mobile smartphones which generally incorporate a camera device demand lens systems which are very small in size and in particular are quite thin. The overall thickness of most modern smartphones is under about 10 millimeters. A lens and detector combination used for a smartphone camera must be appreciably thinner than 10 millimeters if it is to be integrated into a smartphone housing. Thus, the systems described herein are particularly suited for use in conjunction with smartphone imagers as they support a very thin profile.

Other applications which include imagers also sometimes demand that the lens system be small in size or light in weight—or both. For example, new drone type flying cameras benefit from lightweight payloads which enable extended flying times. The lens systems described here are quite small and lightweight and therefore their beneficial use in connection with drone applications is anticipated.

While smartphone manufacturers have admittedly done well to create good quality imaging systems in very small packages, they are nevertheless limited due to the very small lens sizes necessitated by the package space constraints. It is quite inconvenient for smartphone designers to deploy barrel type telescopic collapsing lens system such as those found in common point-and-shoot portable cameras. Rather, smartphones tend to use instead a fixed lens arrangement.

Because users of smartphone cameras still desire high quality imaging and lens choice alternatives, a secondary market for extension devices is now thriving. Compound lenses which clip onto the external housing of smartphones are now on sale in many markets where device add-ons are sold.

In further response to user demand for better imaging optics, manufacturers now seek additional ways in which to improve the imaging optics of very small cameras without overly burdening the space available.

While collapsible telescopic compound lenses are suitable for certain mini camera systems, even the best of them tend to remain prohibitively thick and thus unsuitable for use in some applications having significant space constraints.

A remarkable solution was brought by the same inventor of these instant inventions, and in that solution a collapsible lens translates between an imaging mode and a storage mode where the storage mode is characterized by having elements of the compound lens translated into a common planar volume of very thin dimension—just a few millimeters. While experts in mechanical lens design would consider the spatial arrangement with envy, they would likely be quick to point out that such devices are sure to suffer from lens placement problems. Even where precision mechanical interlocking parts are devised, the lens placement errors which can be observed in successive cycles of the translation means would cause even the most optimistic lens designer to avoid such arrangements. However, it was discovered that certain corrections could 'unmap' image aberrations, these corrections being applied in the digital domain—or in post detector (image plane) processing. That is, in view of the precise nature of the optical system and particularly aberrations associated with expected lens placement errors which can be known in advance, a processing filter could be designed used to improve the imaging. Further details of these very high performance imagers may be reviewed in the applications cited previously herein. That disclosure is hereby incorporated.

In the imaging systems newly disclosed here, yet another means of image correction is provided whereby the particular nature and design of that image correction means is tuned specifically for the types of aberrations which are caused by imperfect mechanical lens alignment or placement errors which can occur in mechanical systems used to achieve a collapsible compound lens having an imaging mode and a storage mode, the storage mode characterized in that the constituent parts of the compound lens all lie in a thin planar volume. Specifically, a lens array is proximally disposed near an image detector, the lens array being comprised of a plurality of lenslet elements distributed over a surface area substantially normal with respect to the system imaging axis. These lens arrays have lenslet elements which may have either a refractive or diffractive affect on incident wavefronts.

Lens array devices of these system are quite particular in comparison to similar lens array devices used previously in other imaging system. This is due in part to the fact that the operation that the lens array performs on a wavefront is specifically designed to counteract imaging effects relating to lens placement variance and the optical aberrations specifics of a collector compound lens. Lens array design of this teaching takes into consideration the aberrations which might be produced by a mechanical collapsing lens mount system which has been characterized and measured to produce image error due to imperfect lens alignment. In previous uses of lens array devices in the optical train and particularly near the image detector, the objectives of using the array are quite different. For example, the so called 'fill factor' for discretized lens detectors can be improved by concentrating light into detector bins and away from 'dead' zones of a detector device. While these interesting functions are sometimes valuable in certain arrangements, those lens arrays of the art have never been used to unmap the image aberrations which are the result of imperfect lens placement.

An innovative optical system proposed and presented here to facilitate collapsing or folding a camera lens module into a thin planar space while providing state-of-the-art image resolution.

A so-called multi-scale optics design may be employed, where optical system is constructed from two parts including: a 'collector' lens group, and a layer of lenslets formed into array or a 'lens array'.

This collector group of lenses defines general nature of imaging and sets the optical system parameters like aperture F# and focal length. While typical high performance imaging systems are arranged as compound lenses having between about 5 and 15 elements, it is preferred in the systems taught herein to use a more simple, lightweight and space conserving first stage or collector portion. In one good illustrative version, a Cooke triplet arrangement of three lens singlets forms the basis of the imaging system. Other possibilities are also useful.

In some versions, a lens element of the compound lens system may be fashioned as a doublet. In systems having a doublet arrangement of two discrete lenses which are in contact, or quite nearly in contact, may be part of a simplified compound lens of several parts. Where a doublet is used, it may be arranged in a mount of a single frame or substrate of the mechanical system. Because the nature of a doublet prescribes that there be little or no space between the two elements, there is no or little advantage in collapsing the doublet. Therefore, some arrangements of these collapsible lens mounts have two lenses of a doublet arrangement affixed within a single frame element.

Thus, compound lenses most suitable for the collapsing devices taught herein preferably have between about 3 and 5 lens elements. While such abbreviated compound lenses can have more aberrations than their more sophisticated brethren having a greater number of distinct lens elements, they do nevertheless offer excellent imaging and far great potential for cooperation with folding and/or collapsing physical mechanisms used to translate between an imaging mode and storage mode. Where a compound lens has too many lens elements, the mechanism which could achieve a desirable collapsing action tends to be overly complex and prohibitively difficult to manufacture. Too many substrate elements of a folding mechanism frustrates the ability to operate in a smooth and efficient manner.

Further, in conventional optics arranged as compound lenses having more than 6 elements, lens positions and orientations must be maintained with very high precision. This precludes them from being used in foldable and collapsible camera modules described herein as mechanical misalignment, hysteresis, tolerance, variance all result in imperfect lens placement required in high performance compound lenses having many elements. In proposed schemes, the collector lenses are simplified to include fewer elements and high precision positioning (unavailable with folding mechanics) is not required.

The primary function of the second part or the lens array portion of the optical system is to compensate optical aberrations which are inevitably created within the simplistic 'collector' part. A lens array when carefully used in conjunction with image detectors made from discrete picture elements or pixels operates to improve fill factor in view of the portion of a detector surface which is inactive. This use of lens arrays is well known by experts in digital imaging. However, it has not been previously attempted to use lens arrays in special purpose configurations which operate cooperatively with the collector portion of a compound lens in a manner to mitigate aberrations. Because aberration detail can be readily known in view of the precise physical nature of a well-defined compound lens set up, these aberrations may be reduced by application of distributed correction having radial dependence. Because lens array elements, the individual lenses distributed over a surface area, can each have a focusing power independent of its neighbor, these can be tuned with particular regard for the nature of the imaging error known to be present as a result of use of the simplified compound lens—such as the Cooke triplet. Typical use of lens arrays at a pixelized detector merely operate to collect light and direct it to a prescribed bin or light sensitive area. The focus power of each lens is generally identical to all other and does not have variance depending upon its distance from the system axis. Conversely, because the detail of aberrations produced by any particular collector portion of these system is well known in advance, a lens array can be fine tuned to operate on the wave front just prior to the imaging plane to 'undo' some aberrations caused by the collector. The thin lens array in combination with the imaging detector is further amenable for use with folding and collapsing systems described.

Accordingly, this novel use of lens array devices at/near the imaging plane of a collapsible lens system results in a very high performance system that additionally has the attributes of very lightweight and small size with particular regard to cooperating with a folding or collapsing function that switches the compound lens components between an imaging mode and a storage mode.

In collapsing systems as described herein and elsewhere, the lens array and imaging detector may be held together in a single frame or substrate element. They may be rigidly affixed to each other to form a single thin element of the collapsing system. These together as one unit can reside within the lens receiving cavity of a the last frame of a frameset. Accordingly in some best versions it is preferred to keep the lenslet array firmly affixed for example via adhesives or mechanical fastener to the sensor. Even combined, both these elements are reasonably thin. In a collapsible system, one frame of the mechanism may be formed with a receiving space to accommodate therein an image detector and lens array combination.

While preferred versions anticipate sliding or folding away each of the lens elements of the collector group from which a compound lens may be formed, it does nevertheless remain possible to arrange elements into subgroups whereby more than one lens or other device of the optical train (i.e. filter, lens array, corrector plate, et cetera) may be combined in a single frame element of the mechanical folding/sliding systems and these subgroups of elements are moved together as if they are one.

Lenslets are preferably organized into a hexagonal array to maximize the 'clear aperture' or area which passes rays from which the useful image is formed. While previous artisans have arranged lens array systems with strong spatial cooperation between lenslet pitch and the pitch of an imaging detector, in particular to improve fill factor, these systems may include lens arrays having lenslet pitch which does not spatially align with detector pixel pitch. As the function of the lens arrays taught herein is not directed to improving fill factor, but rather towards aberration reduction, there is better freedom with regard to choices of lenslet pitch. In some versions, the lenslets may be quite large with respect to the detector pixel elements. Because the lenslet is designed to manipulate the wavefront with respect to image aberrations, its physical nature dependent upon the optical design of the collector rather than the structure present in the detector device.

In some best versions, each lenslet has a 'free-form' refracting surface, i.e. it does not necessarily have a symmetry axis. In general, the refracting surface of each lenslet may be asymmetrical. In a design currently being developed, only a single lenslet surface is curved, the other is flat. These kind of lens arrays may simplify manufacture of the device while nevertheless providing desired corrections. It is also possible to use lens arrays where both surfaces are freeform. In this case, there are even more degrees of freedom in the lenslet shape, which allows to correct aberrations even better.

FIG. 1

Figure 1:
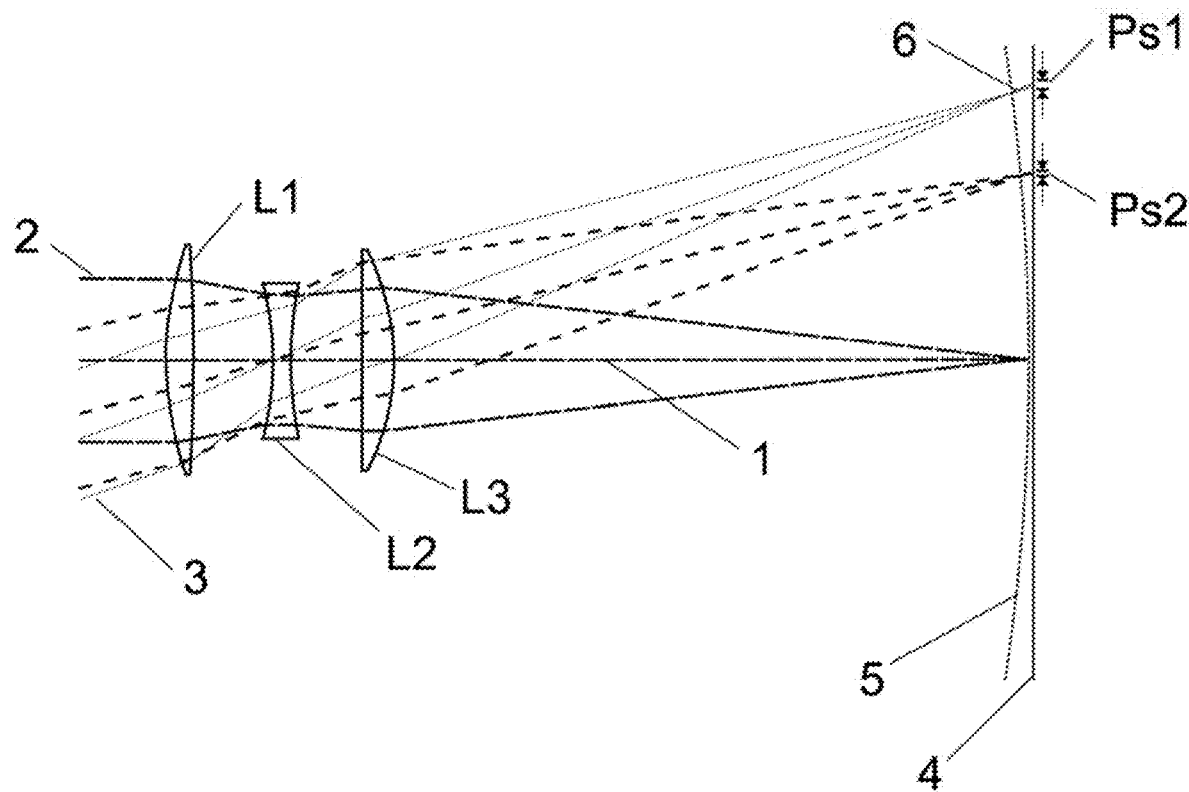
FIG. 1 is a ray trace diagram showing a simplified compound lens suitable for imaging.

FIG. 1 shows an important illustrative version of a compound lens systems sometimes and commonly called a 'Cooke triplet'. Three singlet lens elements operate in conjunction with each other to focus rays onto an image field. While the Cooke triplet is important for its ability to realize correction for all the seven Seidel aberrations, it nevertheless remains imperfect and certain aberrations are not fully mitigated. Thus, to achieve a greater fidelity, lens designers rely upon more complex compound lens systems or use of the Cooke triplet in conjunction with other supporting error correction schemes. In the present inventions, some versions start with a Cooke triplet compound lens and operate it in connection with other corrective means.

To more fully appreciate this, it is necessary to consider the ray trace diagram of FIG. 1 which illustrates in a basic design focusing of three wavefronts at an image field. An system optic axis or imaging axis 1 sets forth important axial symmetry. Lens elements L1, L2 and L3 may be arranged on the axis as shown to receive far-field rays or wavefronts such as those wavefronts 2 incident on axis and wavefronts incident with at an angle with respect to the axis. Ideally, all wavefronts would be imaged onto a planar image field 4 which is the geometry in which typical image detectors are devised. However due to imperfect imaging of the compound lens system, the true nature of an image field might be characterized as slightly spherical 4. The 'best' focus or smallest spot size 6 all incident wavefronts lies on a curved surface.

When an imperfect lens is used with a planar image detector, it is a necessary fact that some defocusing or point spread is observed. In simplest models, this point spread tends to be greater the further one moves from the optic axis. Thus the point spread at PS2 may be slightly less than the point spread at PS1. Of course, this is merely an illustrative presentation to set forth the nature of imaging via imperfect lens systems. A clever observer would point out that the planar image field might be moved slightly towards the lens to average point spread between the axis and periphery with the most ideal focus at a circle midway therebetween to realize a suitably good image. However, in this discussion we are interested in additional means for reducing point spread. Accordingly, we've drawn this description intentionally to bring attention to the point spread function and its dependence on radial distance from the system axis.

FIG. 2

Figure 2:
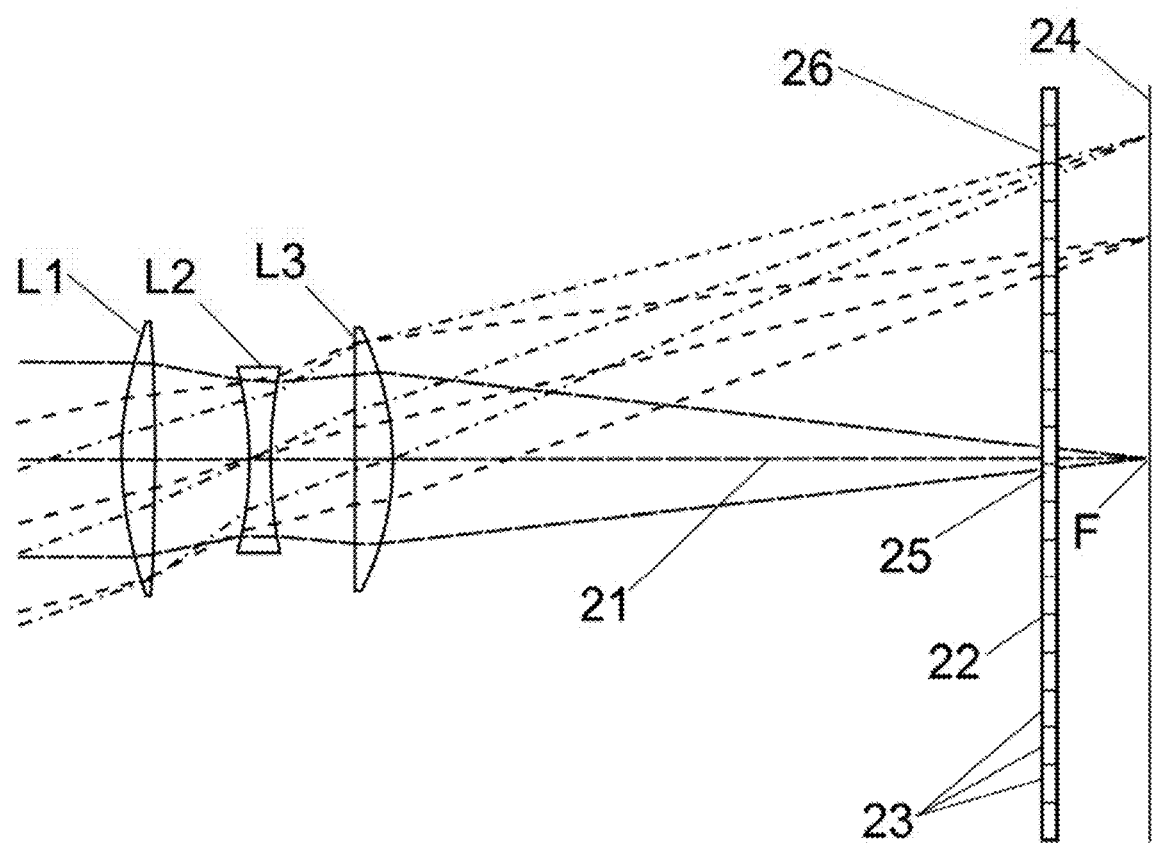
FIG. 2 is a similar ray trace diagram further including a special purpose optical element near the image plane.

FIG. 2 further illustrates an important system which addresses imaging on a planar surface in view of the presence of lens aberrations necessarily found in simple compound lens systems such as the Cooke triplet among others. A system axis 21 supports disposed thereon three lens elements L1, L2 and L3 as shown. A special optical system 22 may be proximally located near the image field. Fashioned as an array of lens elements distributed over a surface in two dimensions, a 'lens array' device is comprised of a many individual lens elements 23. These systems may be formed on a thin substrate of optical material. By 'proximally located' it is meant that the lens array is between about 0.5 and up to several millimeters away from the image plane. An image plane 24 behind the lens array is the location in which rays come to a sharp focus. Because the lens array is comprised of a plurality of individual lenses, each of which may have an independent focus power or strength, it is possible to devise a function dependence on radial distance from the system axis for focus power. Specifically, a dependence that opposes the characteristic and nature of the compound lens aberrations.

For example, lenses of the lens array near the center (axis) may have a stronger focus thus causing the focus point 'F' to be moved toward the left. While lenses at the image field periphery 26 may have a very slight or zero focus power to minimally affect the location of the focus for those rays. In this way, a lens array can be used to 'flatten' the focus field from a curved surface into a plane to achieve high focus or resolution for all areas of the image field.

Because it is preferable to avoid negative focus power on these individual lenses of a lens array, a configuration is selected whereby the lens array operates most strongly on the rays at the system axis and less so as a function of radial distance therefrom. While it remains possible to arrange a lens array that moves the focus spots of the peripheral rays to the right or further away from the compound lens, negative focus power introduces design and fabrication issues which are sometimes usefully avoided. Therefore, a more preferred version includes those as described here and illustrated by FIG. 2.

FIG. 3

Figure 3:
FIG. 3 is a prior art diagram showing a clip-on lens extension suitable for use as high performance imaging means in conjunction with a mobile phone.

FIG. 3 shows a lensing approach popularly being adopted by the community of photographers who enjoy using a smartphone for their photo apparatus choice. Because it is a fundamental attribute of mobile smartphones that they be very small in size and particularly lightweight and very thin, advanced or high performance lenses tend to be incompatible with integrated deployment in a mobile smart phone package. Thus, clever after-market manufacturers have designed nice extension lenses that readily couple to smartphone cameras via 'clip-on' means for example. One version of such clip-on lens system is shown as prior art drawing of the figure. A smartphone 31 includes an interface 32 that drives a camera function. Camera software, imager, and built-in lens are all contained within a very thin package or smartphone housing. A special mounting hardware 33 and cooperating clip 34 enable the coupling of barrel lens 35 having optic axis 36. Users may add such device prior to making photographs or videos by removing the lens from a storage case and affixing it to the smartphone exterior. When finished with using the camera, the user then removes the lens and replaces it into its separate storage facility. While useful and certainly popular, these lenses nevertheless have significant limitations and drawbacks. They are hard to use for some users who don't like to tinker with their phone prior to use. Since the lens is stored separately from the smartphone, it is not always the case that the devices are present together in time of need. Users of these systems tend to leave their advanced lenses at home as they do not travel as well as the highly portable smartphone.

The barrel lenses of U.S. Pat. Nos. 7,453,513, 8,477,230 and 9,182,568 commonly found on 'point-and-shoot' style portable cameras are very nice indeed for those lightweight systems, however, they nevertheless remain too bulky for use on ultra thin devices such as a mobile smartphone. A barrel lens collapses on its axis to remove space between the individual elements of a compound lens in a 'telescopic' action. As such, a compound lens arranged as a telescopic lens barrel can only be collapsed to a thickness which is the sum of all thicknesses of its constituent parts—and no less. Thus, a barrel less still has appreciable thickness even in its collapsed or storage state. This thickness generally too great and thus necessarily excludes use of these devices in a very compact space such as that which is available in a smartphone package.

Conversely, highly unique collapsible lens mounts have now been devised to accommodate a plurality of lens elements from which a high performance compound lens may be formed. Rather than collapsing on axis, these specialized systems may collapse down into a very thin space or planar volume into which all the lens elements may be positioned in a storage mode. Since the thickness system in its storage mode is approximately only as thick as the thickest single element, a considerable advantage is realized. Compound lens systems of this nature may be integrated into very small packages—for example those associated with very portable systems such as a smartphone.

FIG. 4

Figure 4:
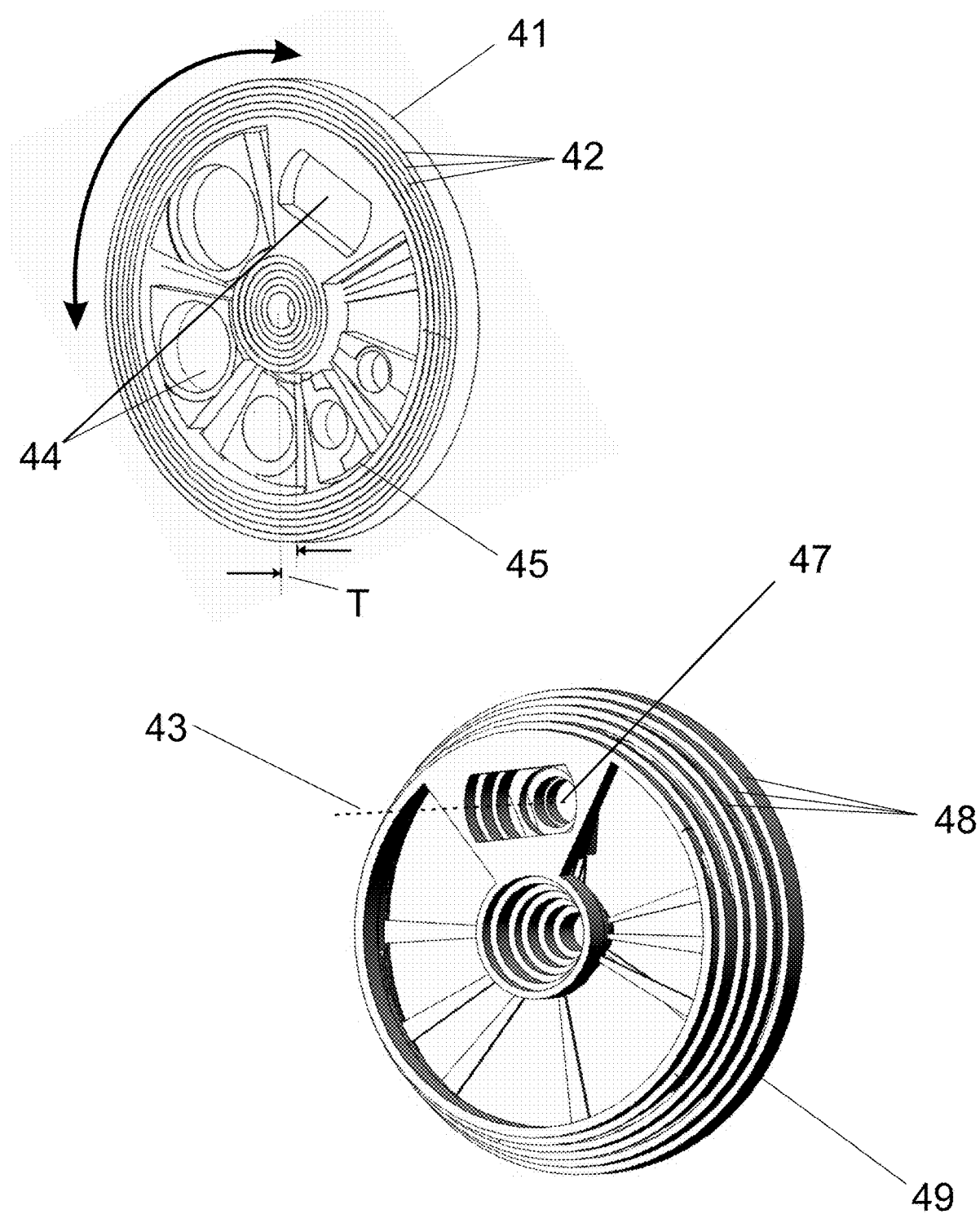
FIG. 4 illustrates a mechanical system of elements which operate to receive and hold lens elements and translate them between imaging and storage modes.

FIG. 4 illustrates one important version of a collapsible imaging system 41 where a plurality of mechanically coupled disk shaped frames or substrates 42 may be counter rotated against each other to move a set of lens elements (e.g. lens singlets) from a thin planar volume storage mode into an imaging mode in which the lens elements are aligned on a single optic or imaging axis 43 forming an system having appreciable thickness. By user tactile force applied for example on an outermost ring, the system is translated between a collapsed storage mode into an active imaging mode. By careful selection of lens singlets and prescribed spacings between these frames in their imaging mode, it is possible to realize preferred compound lenses such as the Cooke triplet arrangement shown in FIG. 1. While FIG. 4 is presented to illustrate one example version where five lens elements may be accommodated in lens receiving spaces of the disk shaped frames to support an advanced compound lens system, it is easy to appreciate that omission of two of the frames would still leave enough capacity to support the three lenses of an appreciably good version of an imager such as the Cooke triplet arrangement. Accordingly, these systems are not meant to be limited to any particular arrangement of compound lens and rather is highly suitable for use in various arrangements having between about two and six individual lens elements.

Optical lenses held in receiving cavities 44 or spaces of these frames operate together when correctly positioned form a compound lens of high imaging performance i.e. when the mount system is placed in its imaging mode. When returned to a storage mode, the system has a reduced thickness 'T'. The disk system is rotated in the opposite direction whereby cam and follower mechanical interlocks cause the disks to move and collapse into very thin space or planar volume. The system has a translation motion having two endpoints or terminal ends. When fully translated in a first direction, the device is in an imaging mode with held lens elements aligned on an optic axis. When fully translated in an opposing direction to a second endpoint, the frames collapse into themselves locating the lens elements in a common thin volume to realize the storage mode.

Accordingly, a collapsible compound lens formed in a manner may be integrated with imagers having very restrictive space and weight limitations. While telescopically collapsible barrel lens systems of the art provide excellent portability for point and shoot camera systems, they remain far too thick in comparison with the devices described here which do not collapse along its optical axis but rather collapses to distribute the constituent lens elements off axis. This allows a far thinner storage mode. Because the final thickness of a resting device in its storage mode can be made quite thin, in some cases as thin as just a few millimeters, the system is amenable for integration with the smallest packages.

Accordingly, these devices fill a remarkable need. Where high quality imaging systems are desired but severely limited space availability exist, these proposed systems offer an excellent solution.

While the rotating system illustrated in FIG. 4 is one preferred version, it should be understood that several alternative mechanical arrangements each having their own advantages can achieve the same effect. This invention is not to be limited to any clever alternative mechanical system of which there are infinitely many, but rather the true nature and scope of the invention is one in which a translation system moves lens element from an imaging position into a storage position where the storage position is characterized as a plurality of lenses lying in a common planar space.

Indeed, one very important version of a collapsible lens system where a compound lens of several individual lens elements is arranged in an imaging mode and those same lens elements are distributed into a plane to realize a thin storage mode includes a 'flip' system arranged about lever arms and pivots. This may be characterized as a linear translation system which moves all lens elements along a single line orthogonal to the imaging axis.

FIG. 5

FIG. 5 is provided to illustrate an alternative translation system of the linear 'flip' type. An optical axis 51 provides a structure upon which a compound lens of multiple lens elements may be arranged. Lens receiving cavities 52 of frame or substrate members 53 are fashioned to receive and hold affixed therein various optical lenses (not shown). Coupling levers 54 are joined to these frames at pivot points 55. Such arrangements provide for a translation that may be characterized as collapsing from a stacked arrangement into a flattened layout where all frame elements 56 finally share a single planar volume.

Further details of this type of mechanical system are put forth in the earlier cited application from which this application draws reference and specifically U.S. Pat. No. 10,334, 192 B2. That application describes in detail several mechanical systems and arrangements that support dual mode collapsible lens systems where lenses are collapsed into a single planar volume for storage (also shown in FIG. 4, upper half). Those mechanical systems and others are incorporated here and they may each be used in connection with a lens array system deployed with an image detector 47 (shown on FIG. 4).

FIG. 6

In one example application in which a particularly advantageous benefit may be easily noticed, these systems may be integrated into the housing or case of a mobile smartphone device. It is a strict design constraint in nearly every version of smartphone that a very limited space and in particular one characterized as thin is necessitated. Because a mobile smartphone must be thin, it is impossible to integrate a barrel type telescoping compound lens. Presently, mobile smartphones almost exclusively use very thin fixed lenses—and generally those comprising but a single element lens.

FIG. 6 shows an important alternative whereby a high performance compound lens system may be integrated within the very small and space constrained package of a smartphone type camera device. A metallic smartphone case 61 has integrated therewith a collapsible lens system 62 as suggested here in conjunction with the internal smartphone camera detector. This collapsible system is compatible with a smartphone type imager because it includes a storage mode that is very thin. When actively using the device to make images, the mechanism is extended into an imaging mode whereby a plurality of individual lens elements are assembled together as a compound lens, each lens element being aligned on a common system axis or imaging axis. When the device is no longer being used for imaging, the compound lens is collapsed down via simple tactile manipulation into a storage mode characterized as a thin planar volume.

FIG. 7

FIG. 7 illustrates a ray trace diagram to better show a lens array in close proximity with an image plane. Because the power of each lens can be controlled separately, it is possible to apply correction to ray bundles as a function of their distance from the axis. In this way, the lens array so arranged operates to correct for certain lens aberrations associated with abbreviated compound lenses having fewer than about 6 lens elements. In the diagram, a compound lens 'collector' portion is comprised of L1, L2, and L3 that together form a compound imaging lens in the Cooke Triple configuration. While this type of imager has very good imaging characteristics, most versions do nevertheless have remaining aberrations at the image plane and particularly in portions of the image plane far from the axis.

Rays emanating from the single point 71 take separate paths through the optical system to be rejoined together at the image plane 72. Prior to being imaged wavefronts pass through either of the lenslets of the lens array system. Ray bundles far from the axis may experience a higher focus power than those closer to the system axis. Accordingly, aberrations which generally have radial dependence can he addressed by lens arrays near the image plane.

This is better understood in view of the perspective shaded diagram of FIG. 8 which shows a similar arrangement of the collector portion of the optical system arranged as a three lens element configuration and a lens array having a plurality of hexagonal lenslets. Ray bundles far from the imaging axis have a different degree of manipulation that those near the axis due to the variances of the refractive surfaces of each lenslet device.

It is important to note that the lenslet devices may not in fact be axially symmetric as typical of common imaging lenses. As these lenslets are not used in an imaging configuration, they don't not have to be formed with axial symmetry. In some lens array manufacturing techniques, lenslets may be formed in a lithographic process which permits great latitude with regard to shape and size.

A compound lens of three lens elements 81 make up the collector portion of the imaging system. A lens array device 82 located near the image plane and detector operates on incident wavefronts whereby the image spot size 83 may be reduced for points far from the system axis. Spots near the system axis 84 may be sufficiently small and in less need of influence from the lens array manipulation.

Filter in Digital Domain

In addition to use of special purpose lens arrays at or near the image plane for the purpose of correcting lens aberrations it is also possible to further improve the image by making adjustments in the digital domain. Because each element of the imaging system imparts upon the wavefront an impulse response function which can become well known via special measurement technique. In one example, a neural network type learning system which adjust algorithm parameters while considering feedback from the digital signal at the image plane. In this way, a custom digital filter can be derived that is matched to the optical train including the collector portion and the lens array portion—i.e. the non digital portion of the device. Together, lens array correction and digital filtering can be used to arrive at excellent imaging results for very modest collector lens designs having only a few lens elements and as few as one.

There exists special synergy in these proposed aberration reduction means in view of the nature of the collapsible optical systems proposed. Common collapsible lens systems of the art collapse along the optic axial in a telescopic translation. In such systems, off axis lens placement errors may be negligible. Conversely, in the folding and helical arrangements described herein, lens placement errors are more complex and impart upon the imaging system a greater load with respect to aberration. Therefore aberration type and correction thereof is a more complex proposition. As such, it is particularly beneficial to collapsible lens systems such as those proposed herein to apply these very novel aberration mitigation strategies such as deploying a lens array near the image plane and further deploying special digital filtering technique of the image signal in the digital domain.

Accordingly, advanced versions of these system include a collapsible lens system which has two modes including a storage mode and an imaging mode. The storage mode is characterized as having a plurality of lens elements that lie in a single common thin planar volume. Further, these system include aberration mitigation means including a lens array disposed near the image plane. Still further some systems optionally include a digital filtering aberration correction via application of algorithmic correction that is specific to the precise nature of the optical train.

The examples above are directed to specific embodiments which illustrate preferred versions of devices and methods of these inventions. In the interests of completeness, a more general description of devices and the elements of which they are comprised as well as methods and the steps of which they are comprised is presented herefollowing.

One will now fully appreciate how a lens array aberration corrector can be used in conjunction with a prescribed collector compound lens in a collapsible system to improve optical imaging performance. Although the present invention has been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:

1. A collapsible imaging system comprising:
a lens array proximally disposed near an image sensor,
two operational modes having an imaging mode and a storage mode, the imaging mode having a plurality of cooperating lens elements arranged about a common optic axis, and the storage mode having a plurality of cooperating lens elements arranged within a common thin planar volume,
wherein the lens array comprises a plurality of lens elements formed on a singe substrate as lens-let or lenticular lens,
wherein all lens elements of the imaging system are arranged off optical axis when the imaging system is collapsed;
wherein all lens elements form an image when the imaging system is in an imaging mode;
wherein the lens array comprises a plurality of lens elements distributed in two dimensions, a focusing power of the constituent lens elements being dependent upon a distance from the plurality of lens elements to the optical axis; and
wherein the focusing power dependence further comprises a positive focus value for a lens nearest the optical axis and a decreasing focus value for all lens elements as a function of their respective distance from the optical axis, the focusing power approaching zero at the lens array periphery.

2. The collapsible imaging systems of claim 1 further comprises lens elements, each lens element having a polygon shaped surface area.

3. The collapsible imaging systems of claim 2, wherein the polygon shaped surface area of each lens element being on the order of about 0.5-5 square millimeters.

4. The collapsible imaging systems of claim 2, further comprising a microlens array, wherein each microlens of the microlens array has a clear aperture of less than about 1 square millimeter.

5. The collapsible imaging systems of claim 1 further comprising a static filter operable for application in an electrical domain, said static filter having design features particularly cooperative with respect to physical optics.

6. The collapsible imaging systems of claim 5, wherein the lens elements form a Cooke triplet or Cooke triplet like compound lens.

* * * * *